(12) United States Patent
Chen et al.

(10) Patent No.: US 12,246,650 B2
(45) Date of Patent: Mar. 11, 2025

(54) METHOD OF DISPLAYING REAR-VIEW IMAGE AND DIGITAL DASHBOARD USING THE SAME

(71) Applicant: Kinpo Electronics, Inc., New Taipei (TW)

(72) Inventors: Yu Chi Chen, New Taipei (TW); Hsien Chung Chen, New Taipei (TW); Sheng-Chang Wu, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 153 days.

(21) Appl. No.: 18/170,488

(22) Filed: Feb. 16, 2023

(65) Prior Publication Data

US 2023/0339403 A1 Oct. 26, 2023

(30) Foreign Application Priority Data

Apr. 20, 2022 (CN) .......................... 202210417680.1

(51) Int. Cl.
| | |
|---|---|
| *B60R 1/28* | (2022.01) |
| *B60K 35/00* | (2006.01) |
| *G06V 20/58* | (2022.01) |
| *G09G 3/20* | (2006.01) |
| *B60K 35/28* | (2024.01) |
| *B60K 35/29* | (2024.01) |

(52) U.S. Cl.
CPC .............. *B60R 1/28* (2022.01); *B60K 35/00* (2013.01); *G06V 20/58* (2022.01); *G09G 3/20* (2013.01); *B60K 35/28* (2024.01); *B60K 35/29* (2024.01); *B60K 2360/176* (2024.01); *B60K 2360/178* (2024.01); *B60K 2360/191* (2024.01); *G09G 2340/12* (2013.01); *G09G 2340/14* (2013.01); *G09G 2380/10* (2013.01)

(58) Field of Classification Search
CPC .. G09G 3/20; G09G 2340/12; G09G 2340/14; G09G 2380/10; G09G 5/003; B60K 35/29; B60K 35/28; B60K 35/00; B60K 2360/178; B60K 2360/191; B60K 2360/176; B60R 1/28; B60R 1/00; G06V 20/58; B62J 50/22
See application file for complete search history.

(56) References Cited

U.S. PATENT DOCUMENTS

| | | | |
|---|---|---|---|
| 6,278,364 B1 * | 8/2001 | Robert ................... | B60Q 1/444 340/463 |
| 2014/0055610 A1 * | 2/2014 | Ko .......................... | G06T 7/194 348/143 |
| 2014/0340516 A1 * | 11/2014 | Vojtisek ................... | B60R 1/23 348/148 |

(Continued)

FOREIGN PATENT DOCUMENTS

| | | |
|---|---|---|
| CN | 102314315 | 1/2012 |
| TW | 201350369 | 12/2013 |
| TW | M556048 | 2/2018 |

*Primary Examiner* — Phi Hoang
(74) *Attorney, Agent, or Firm* — JCIPRNET

(57) ABSTRACT

A method of displaying a rear-view image and a digital dashboard using the method are provided. The method includes: receiving a rear-view image; and displaying the rear-view image on a default area of a display in response to receiving a signal associated with a direction indicator light, wherein the default area corresponds to the direction indicator light.

14 Claims, 6 Drawing Sheets

(56) References Cited

U.S. PATENT DOCUMENTS

| | | |
|---|---|---|
| 2016/0214536 A1* | 7/2016 | Burdge ..................... B60R 1/26 |
| 2021/0188159 A1* | 6/2021 | Fukutaka ................. B60Q 1/46 |
| 2022/0012504 A1 | 1/2022 | Liu et al. |
| 2022/0157077 A1* | 5/2022 | Gupta ................ G06V 40/1318 |
| 2022/0203897 A1* | 6/2022 | Baur .......................... B60R 1/28 |
| 2022/0305997 A1* | 9/2022 | Choi ....................... B60R 1/074 |

* cited by examiner

METHOD OF DISPLAYING REAR-VIEW IMAGE AND DIGITAL DASHBOARD USING THE SAME

CROSS-REFERENCE TO RELATED APPLICATION

This application claims the priority benefit of China application serial no. 202210417680.1, filed on Apr. 20, 2022. The entirety of the above-mentioned patent application is hereby incorporated by reference herein and made a part of this specification.

BACKGROUND

Technical Field

The disclosure relates to a method of displaying a rear-view image and a digital dashboard using the method.

Description of Related Art

Currently, most motorcycles in the mainstream market use digital dashboards instead of traditional dashboards. Compared with the traditional dashboard, the digital dashboard can provide more functions, such as displaying the speed or displaying the time in numbers. However, limited by the size of the digital dashboard, the conventional digital dashboard still cannot provide functions such as displaying rear-view images for driving.

SUMMARY

The disclosure provides a method of displaying a rear-view image, and a digital dashboard using the method can play and display the rear-view image through the digital dashboard for a user to view when a motorcycle is turning or switching lanes.

A digital dashboard of the disclosure includes a display, a transceiver, and a processor. The transceiver receives a rear-view image. The processor is coupled to the transceiver and the display. The processor displays the rear-view image on a default area of the display in response to receiving a signal associated with a direction indicator light through the transceiver. The default area corresponds to the direction indicator light.

In an embodiment of the disclosure, the display includes a first area corresponding to a first direction and a second area corresponding to a second direction. The processor sets the first area as the default area in response to the direction indicator light corresponding to the first direction.

In an embodiment of the disclosure, the processor receives dashboard information through the transceiver and displays the dashboard information on the second area.

In an embodiment of the disclosure, the processor fades an image displayed on the second area.

In an embodiment of the disclosure, the rear-view image includes a first rear-view image corresponding to a first direction and a second rear-view image corresponding to a second direction. The processor displays the first rear-view image on the default area in response to the direction indicator light corresponding to the first direction.

In an embodiment of the disclosure, the processor issues a warning through the display in response to detecting a moving vehicle in a first warning area of the rear-view image.

In an embodiment of the disclosure, the warning includes: displaying an image special effect on an edge of the rear-view image through the display.

In an embodiment of the disclosure, the warning includes: displaying an image special effect on a profile of the moving vehicle in the rear-view image through the display.

In an embodiment of the disclosure, the image special effect includes flickering. A frequency of the flickering is proportional to a speed of the moving vehicle.

In an embodiment of the disclosure, the processor displays the rear-view image in response to detecting the moving vehicle in a second warning area of the rear-view image. The second warning area is larger than and includes the first warning area.

In an embodiment of the disclosure, the transceiver receives the rear-view image through a controller area network protocol.

A method of displaying a rear-view image of the disclosure is applicable to a digital dashboard and includes the following steps. The rear-view image is received. The rear-view image is displayed on a default area of a display in response to receiving a signal associated with a direction indicator light. The default area corresponds to the direction indicator light.

In an embodiment of the disclosure, the display includes a first area corresponding to a first direction and a second area corresponding to a second direction. The method further includes the following step. The first area is set as the default area in response to the direction indicator light corresponding to the first direction.

In an embodiment of the disclosure, the method further includes the following step. Dashboard information is received, and the dashboard information is displayed on the second area.

In an embodiment of the disclosure, the method further includes the following step. An image displayed on the second area is faded.

In an embodiment of the disclosure, the rear-view image includes a first rear-view image corresponding to a first direction and a second rear-view image corresponding to a second direction. The step of displaying the rear-view image on the default area of the display includes displaying the first rear-view image on the default area in response to the direction indicator light corresponding to the first direction.

In an embodiment of the disclosure, the method further includes the following step. A warning is issued through the display in response to detecting a moving vehicle in a first warning area of the rear-view image.

In an embodiment of the disclosure, the warning includes: displaying an image special effect on an edge of the rear-view image through the display.

In an embodiment of the disclosure, the warning includes: displaying an image special effect on a profile of the moving vehicle in the rear-view image through the display.

In an embodiment of the disclosure, the image special effect includes flickering. A frequency of the flickering is proportional to a speed of the moving vehicle.

In an embodiment of the disclosure, the step of displaying the rear-view image on the default area of the display includes displaying the rear-view image in response to detecting the moving vehicle in a second warning area of the rear-view image. The second warning area is larger than and includes the first warning area.

In an embodiment of the disclosure, the method further includes the following step. The rear-view image is received through a controller area network protocol.

Based on the above, the digital dashboard of the disclosure may display the rear-view image of the motorcycle according to the signal of the direction indicator light, so as to help the user to grasp the rear road conditions in real time when turning or switching lanes.

DETAILED DESCRIPTION OF DISCLOSED EMBODIMENTS

Figure 1:
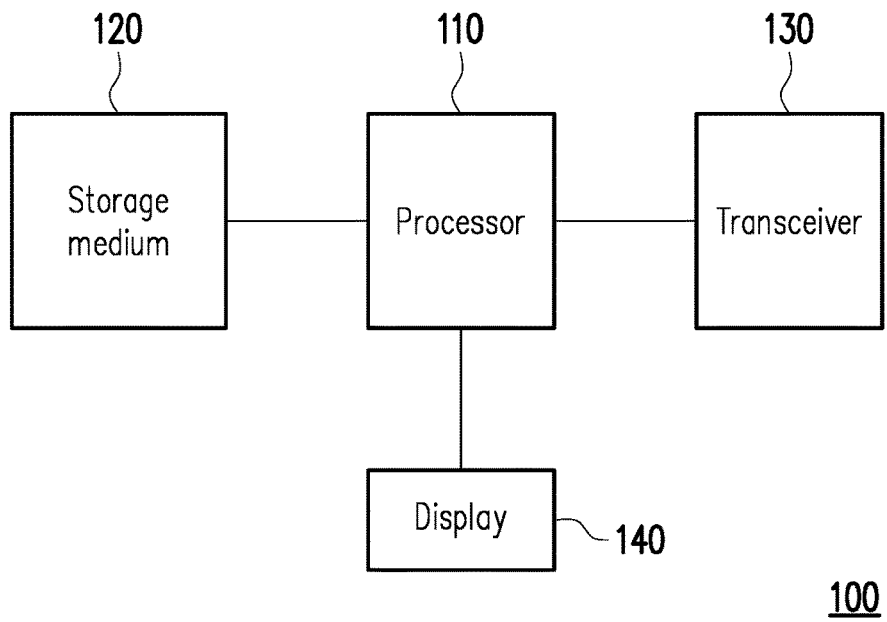
FIG. 1 is a schematic diagram of a digital dashboard according to an embodiment of the disclosure.

In order for the content of the disclosure to be more comprehensible, the following specific embodiments are given as examples according to which the disclosure can indeed be implemented. In addition, wherever possible, elements/components/steps using the same reference numerals in the drawings and the embodiments represent the same or similar parts.

FIG. 1 is a schematic diagram of a digital dashboard 100 according to an embodiment of the disclosure. The digital dashboard 100 may include a processor 110, a storage medium 120, a transceiver 130, and a display 140.

The processor 110 is, for example, a central processing unit (CPU), other programmable general purpose or specific purpose micro control units (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable logic gate arrays (FPGA), other similar elements, or a combination of the above elements. The processor 110 may be coupled to the storage medium 120, the transceiver 130, and the display 140, and access and execute multiple modules and various application programs stored in the storage medium 120, so as to execute various functions of the digital dashboard 100.

The storage medium 120 is, for example, any type of fixed or removable random access memory (RAM), read only memory (ROM), flash memory, hard disk drive (HDD), solid state drive (SSD), similar elements, or a combination of the above elements, and is used to store multiple modules or various application programs that can be executed by the processor 110.

The transceiver 130 transmits and receives signals in a wired manner. The transceiver 130 may also execute operations such as low noise amplification, impedance matching, frequency mixing, up or down frequency conversion, filtering, amplification, and the like. The processor 110 may receive signals from an electronic control unit (ECU) or a driving recorder of a motorcycle in a wireless or wired manner through the transceiver 130, wherein the signals may include signals associated with a direction indicator light or a rear-view image, or may include dashboard information of the motorcycle. The transceiver 130 may communicate with the electronic control unit or the driving recorder through a controller area network (CAN) protocol.

The signals of the rear-view image may include the rear-view image corresponding to a right direction and the rear-view image corresponding to a left direction, wherein the rear-view image in the right direction may be similar to an image captured by a right rear mirror of the motorcycle and the rear-view image in the left direction may be similar to an image captured by a left rear mirror of the motorcycle.

The dashboard information may include, but is not limited to, information such as engine fault diagnostic light, neutral indicator light and/or gear display, oil change indicator light, high beam indicator light, speed, rotational speed, fuel level, time, overrun light, and mileage.

The display 140 may include a liquid crystal display panel or an organic light emitting diode display panel (OLED), and the display panel may further be a twisted nematic liquid crystal display (LCD) panel or a thin film transistor LCD panel. The processor 110 may display information such as the direction indicator light, the rear-view image, or the dashboard information through the display 140. In an embodiment, the display 140 may only be used to display a part of the information of the digital dashboard 100, and other information may be displayed to a user by the processor 110 through an output device such as a light bulb (not shown in the drawing).

Figure 2:
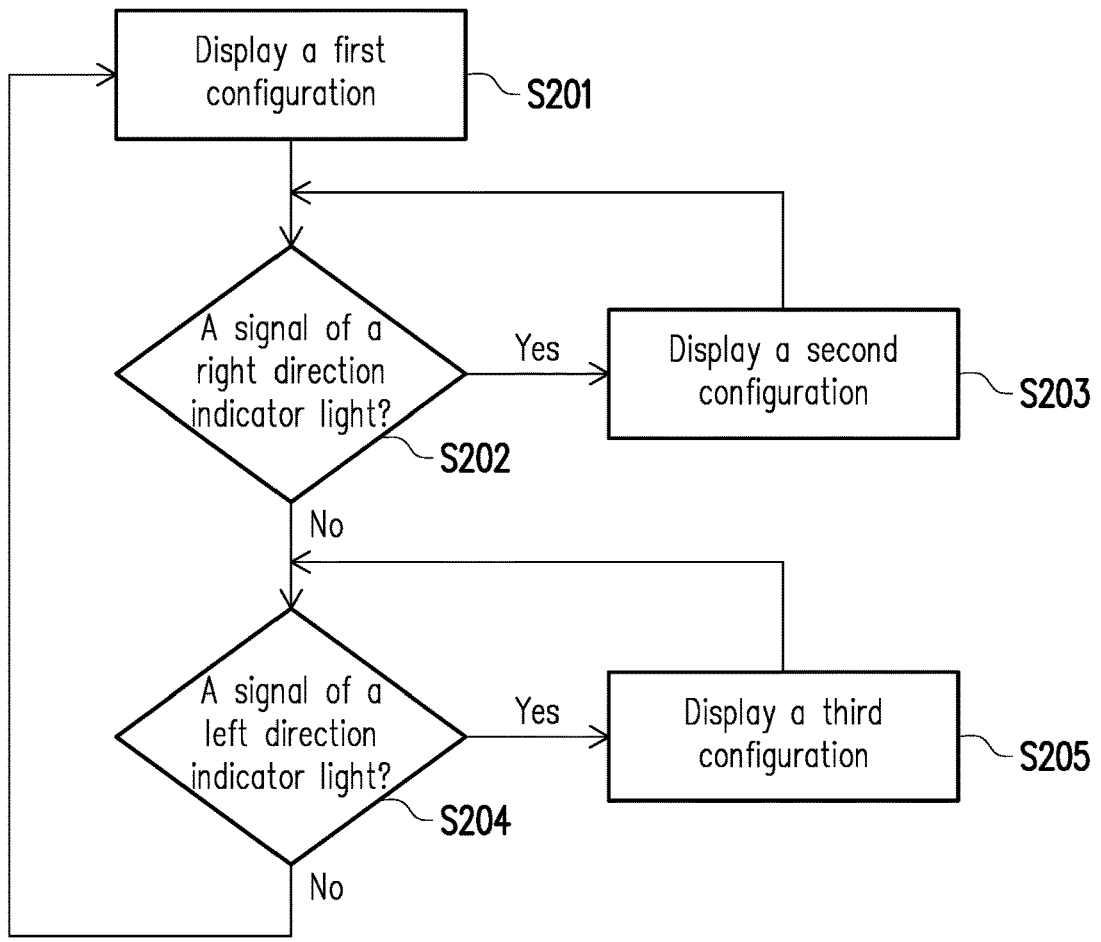
FIG. 2 is a flowchart of displaying a rear-view image according to an embodiment of the disclosure.

FIG. 2 is a flowchart of displaying a rear-view image according to an embodiment of the disclosure, wherein the process may be implemented by the digital dashboard 100 shown in FIG. 1. Assuming that the motorcycle is in a travelling straight state at the beginning, in Step S201, the processor 110 may display a first configuration through the display 140, wherein the first configuration is a configuration displayed by the display 140 in the travelling straight state.

Figure 3A:
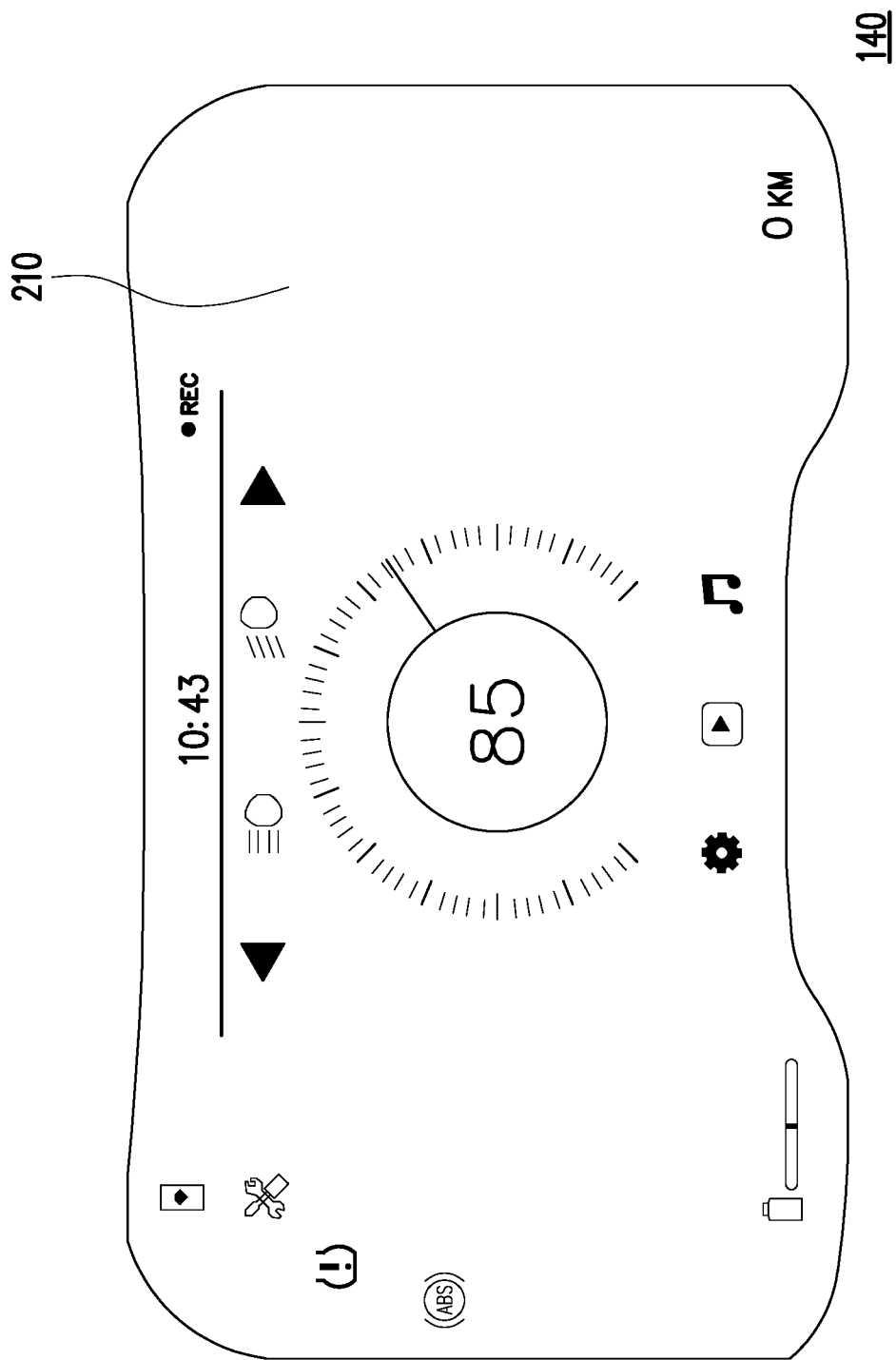
FIG. 3A is a schematic diagram of a first configuration of a display according to an embodiment of the disclosure.

FIG. 3A shows a schematic diagram of the first configuration of the display 140 according to an embodiment of the disclosure. The first configuration of the display 140 may include a display area, an area 210. The processor 110 may display the dashboard information such as engine fault diagnostic light, neutral indicator light and/or gear display, oil change indicator light, high beam indicator light, speed, rotational speed, fuel level, time, overrun light, and mileage through the area 210.

Returning to FIG. 2, in Step S202, the processor 110 may judge whether a signal associated with a right direction indicator light is received. If the processor 110 receives the signal associated with the right direction indicator light through the transceiver 130, Step S203 is proceeded. If the processor 110 does not receive the signal associated with the right direction indicator light through the transceiver 130, Step S204 is proceeded.

In Step S203, the processor 110 may display a second configuration through the display 140, wherein the second configuration may display the rear-view image corresponding to the right direction indicator light on a default area corresponding to the right direction indicator light.

Figure 3B:
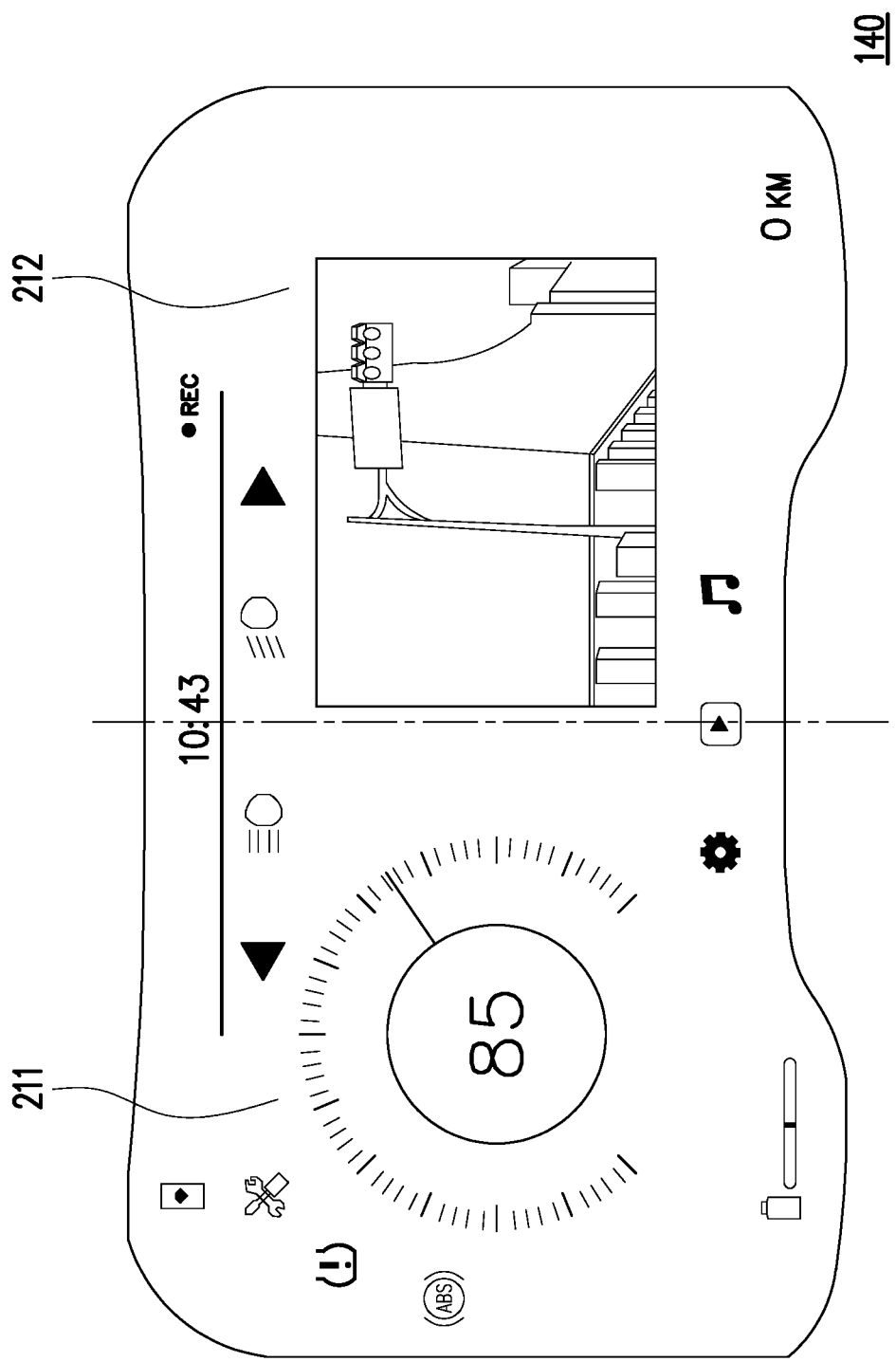
FIG. 3B is a schematic diagram of a second configuration of a display according to an embodiment of the disclosure.

FIG. 3B is a schematic diagram of the second configuration of the display 140 according to an embodiment of the disclosure. Specifically, after processor 110 receives the signal associated with the right direction indicator light, the processor 110 may divide the display area of the display 140 from the area 210 into an area 211 (which may be located on a left side of the display 140) corresponding to the left direction and an area 212 (which may be located to a right side of the display 140) corresponding to the right direction. The processor 110 may set the area 212 corresponding to the right direction as the default area in response to the received signal corresponding to the right direction, so as to display the rear-view image in the right direction through the default area. On the other hand, the processor 110 may display the dashboard information in the area 211 corresponding to the left direction. In other words, an image originally displayed in the larger area 210 may be reduced and displayed in the smaller area 211. In an embodiment, the processor 110 may fade the image displayed in the area 211, so that the rear-view image displayed in the area 212 is more prominent to help the user to focus on viewing the rear-view image.

Returning to FIG. 2, in Step S204, the processor 110 may judge whether a signal associated with a left direction indicator light is received. If the processor 110 receives the signal associated with the left direction indicator light through the transceiver 130, Step S205 is proceeded. If the processor 110 does not receive the signal associated with the left direction indicator light through the transceiver 130, Step S201 is re-executed.

In Step S205, the processor 110 may display a third configuration through the display 140, wherein the third configuration may display the rear-view image corresponding to the left direction indicator light on a default area corresponding to the left direction indicator light.

Figure 3C:
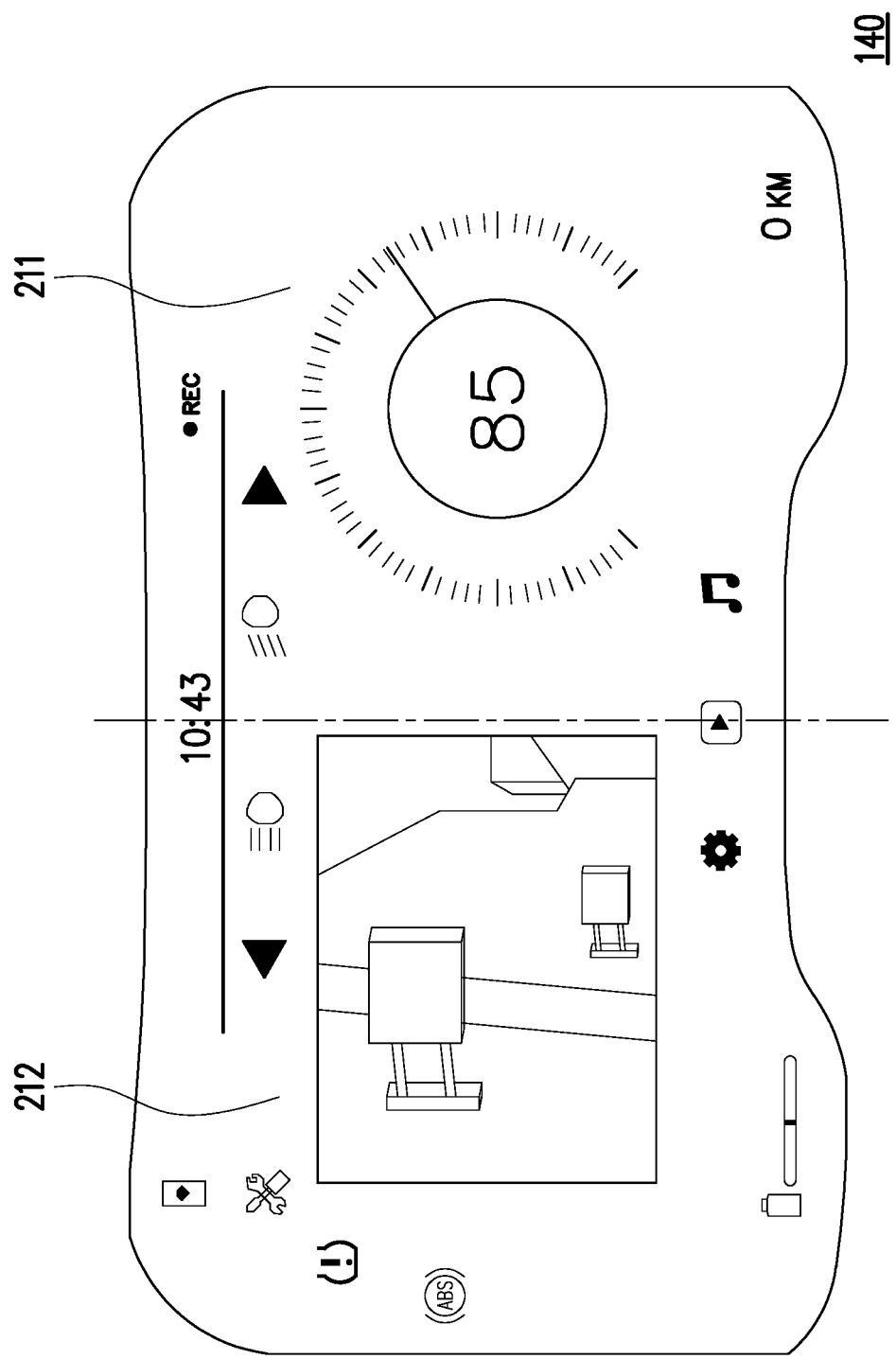
FIG. 3C is a schematic diagram of a third configuration of a display according to an embodiment of the disclosure.

FIG. 3C is a schematic diagram of the third configuration of the display 140 according to an embodiment of the disclosure. Specifically, after the processor 110 receives the signal associated with the left direction indicator light, the processor 110 may divide the display area of the display 140 from the area 210 into the area 212 corresponding to the left direction and the area 211 corresponding to the right direction. The processor 110 may set the area 212 corresponding to the left direction as the default area in response to the received signal corresponding to the left direction, so as to display the rear-view image in the left direction through the default area. On the other hand, the processor 110 may display the dashboard information in the area 211 corresponding to the right direction. In other words, an image originally displayed in the larger area 210 may be reduced and displayed in the smaller area 211. In an embodiment, the processor 110 may fade the image displayed in the area 211, so that the rear-view image displayed in the area 212 is more prominent to help the user to focus on viewing the rear-view image.

Figure 3D:
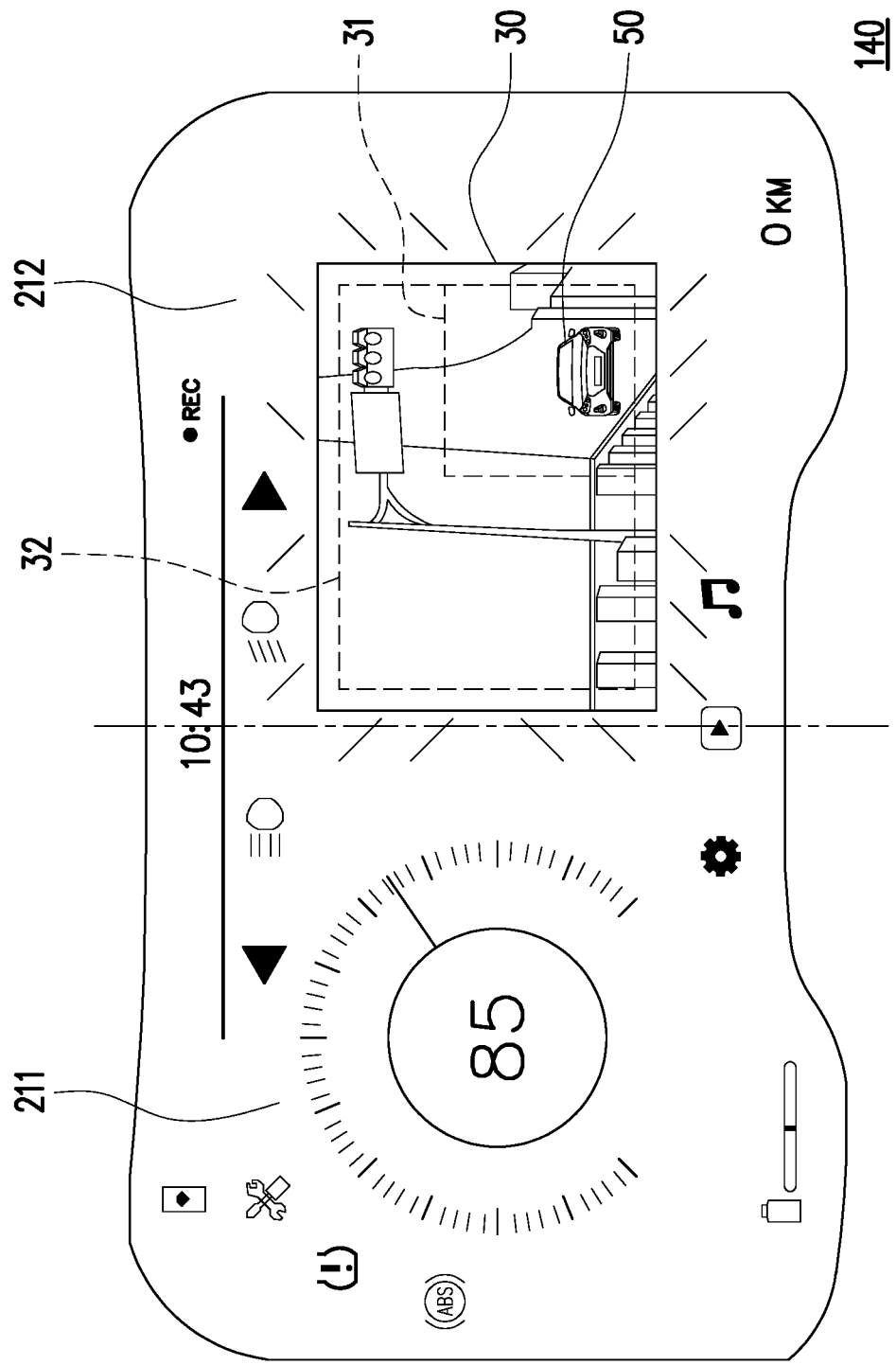
FIG. 3D is a schematic diagram of a blind spot warning function of a digital dashboard according to an embodiment of the disclosure.

In an embodiment, the digital dashboard 100 may have a blind spot warning function. FIG. 3D is a schematic diagram of the blind spot warning function of the digital dashboard 100 according to an embodiment of the disclosure. Specifically, the storage medium 120 of the digital dashboard 100 may pre-store a warning area 31 and a warning area 32 corresponding to the rear-view image, wherein the warning area 32 may be larger than and include the warning area 31. For example, the warning area 31 may be pre-configured in a blind spot less noticeable by a rider or an area with safety concerns when turning. After obtaining the rear-view image, the processor 110 may execute image recognition or object tracking on the rear-view image to detect a moving vehicle in the rear-view image. If the processor 110 detects a profile 50 recognized as a moving vehicle in the warning area 31 of the rear-view image, the processor 110 may issue a warning through the display 140 to remind the rider to be alert when turning.

In an embodiment, the processor 110 may display an image special effect on an edge 30 of the rear-view image through the display 120. For example, the processor 110 may display a flickering effect on the edge 30 of the rear-view image through the display 120.

In an embodiment, the processor 110 may display the image special effect on the profile 50 of the moving vehicle in the rear-view image through the display 120. The image special effect includes, for example, displaying the profile 50 with an obvious halo or displaying a flickering effect on the profile 50. The frequency of the flickering effect may be proportional to the speed of the moving vehicle in the rear-view image. For example, the faster the speed at which the moving vehicle approaches a camera capturing the rear-view image (or approaches the motorcycle installed with the digital dashboard 100), the higher the frequency of the flickering effect. The slower the speed at which the moving vehicle approaches the camera capturing the rear-view image (or approaches the motorcycle installed with the digital dashboard 100), the lower the frequency of the flickering effect.

The processor 110 may judge a traffic flow of a road on which the motorcycle travels according to the warning area 32. Specifically, the processor 110 may execute image recognition or object tracking on the rear-view image to detect the moving vehicle in the warning area 32. If the processor 110 does not detect a moving vehicle in the warning area 32, it means that the road on which the motorcycle travels has less traffic flow. For example, the motorcycle equipped with the digital dashboard 100 may be travelling on a country road with few vehicles passing by. Accordingly, the processor 110 may decide not to display the rear-view image on the display 140 in response to not detecting the moving vehicle in the warning area 32, so that the rider can focus on road conditions ahead. On the other hand, if the processor 110 detects a moving vehicle in the warning area 32, it means that the road on which the motorcycle is traveling has more traffic flow. Accordingly, the processor 110 may decide to display the rear-view image on the display 140 in response to detecting the moving vehicle in the warning area 32, so as to remind the rider to pay attention to vehicles behind when turning or changing lanes.

Figure 4:
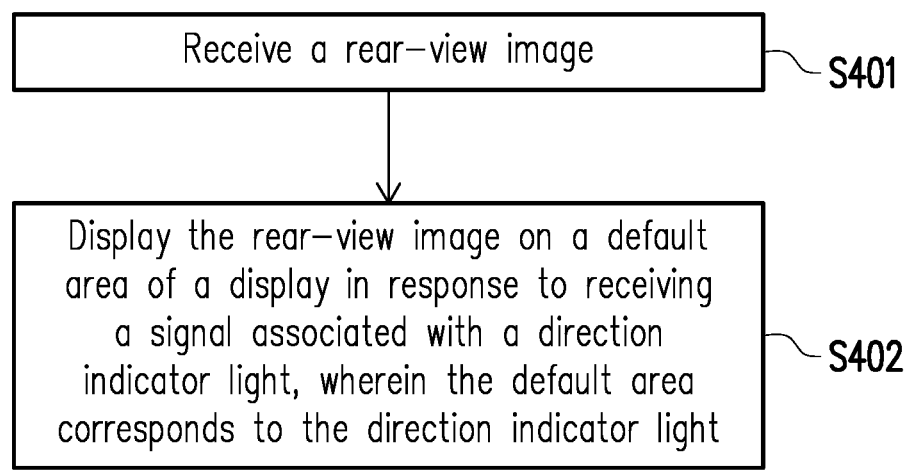
FIG. 4 is a flowchart of a method of displaying a rear-view image according to an embodiment of the disclosure.

FIG. 4 is a flowchart of a method of displaying a rear-view image according to an embodiment of the disclosure, wherein the method may be implemented by the digital dashboard 100 shown in FIG. 1. In Step S401, a rear-view image is received. In Step S402, the rear-view image is displayed on a default area of a display in response to receiving a signal associated with a direction indicator light, wherein the default area corresponds to the direction indicator light.

In summary, the digital dashboard of the disclosure may display the rear-view image in a direction for the user to view when the user intends to turn toward the direction or switch lanes, so that the user can grasp rear vehicle conditions in real time. The digital dashboard may change the screen to display the rear-view image and enable the displayed rear-view image to be more prominent through a manner such as fading the image.

What is claimed is:

1. A digital dashboard comprising:
   a display;
   a transceiver, receiving a rear-view image; and
   a processor, coupled to the transceiver and the display,
      wherein the processor displays the rear-view image on
      a default area of the display in response to receiving a signal associated with a direction indicator light through the transceiver, wherein the default area corresponds to the direction indicator light, wherein the processor issues a warning through the display in response to detecting a moving vehicle in a first warning area of the rear-view image, wherein the warning comprises: displaying an image special effect on a profile of the moving vehicle in the rear-view image through the display, wherein the image special effect comprises flickering, wherein a frequency of the flickering is proportional to a speed of the moving vehicle.

2. The digital dashboard according to claim 1, wherein the display comprises a first area corresponding to a first direction and a second area corresponding to a second direction, wherein the processor sets the first area as the default area in response to the direction indicator light corresponding to the first direction.

3. The digital dashboard according to claim 2, wherein the processor receives dashboard information through the transceiver and displays the dashboard information on the second area.

4. The digital dashboard according to claim 2, wherein the processor fades an image displayed on the second area.

5. The digital dashboard according to claim 1, wherein the rear-view image comprises a first rear-view image corresponding to a first direction and a second rear-view image corresponding to a second direction, wherein the processor displays the first rear-view image on the default area in response to the direction indicator light corresponding to the first direction.

6. The digital dashboard according to claim 1, wherein the warning comprises: displaying an image special effect on an edge of the rear-view image through the display.

7. The digital dashboard according to claim 1, wherein the processor displays the rear-view image in response to detecting the moving vehicle in a second warning area of the rear-view image, wherein the second warning area is larger than and comprises the first warning area.

8. A method of displaying a rear-view image, applicable to a digital dashboard, the method comprising:
receiving the rear-view image;
displaying the rear-view image on a default area of a display in response to receiving a signal associated with a direction indicator light, wherein the default area corresponds to the direction indicator light; and
issuing a warning through the display in response to detecting a moving vehicle in a first warning area of the rear-view image, wherein the warning comprises: displaying an image special effect on a profile of the moving vehicle in the rear-view image through the display, wherein the image special effect comprises a flickering effect, wherein a frequency of the flickering effect is proportional to a speed of the moving vehicle.

9. The method according to claim 8, wherein the display comprises a first area corresponding to a first direction and a second area corresponding to a second direction, the method further comprising:
setting the first area as the default area in response to the direction indicator light corresponding to the first direction.

10. The method according to claim 9, further comprising:
receiving dashboard information, and displaying the dashboard information on the second area.

11. The method according to claim 9, further comprising:
fading an image displayed on the second area.

12. The method according to claim 8, wherein the rear-view image comprises a first rear-view image corresponding to a first direction and a second rear-view image corresponding to a second direction, wherein the step of displaying the rear-view image on the default area of the display comprises:
displaying the first rear-view image on the default area in response to the direction indicator light corresponding to the first direction.

13. The method according to claim 8, wherein the warning comprises: displaying an image special effect on an edge of the rear-view image through the display.

14. The method according to claim 8, wherein the step of displaying the rear-view image on the default area of the display comprises:
displaying the rear-view image in response to detecting the moving vehicle in a second warning area of the rear-view image, wherein the second warning area is larger than and comprises the first warning area.

* * * * *